350-374 SR CROSS REFERENCE SEARCH ROOM
XR 3,439,348

April 15, 1969 T. J. HARRIS ET AL 3,439,348

ELECTROOPTICAL MEMORY

Filed Jan. 14, 1966

INVENTORS
THOMAS J. HARRIS
KURT M. KOSANKE
WERNER W. KULCKE
ERHARD MAX

BY Owen Lamb
AGENT

3439348

United States Patent Office 3,439,348
Patented Apr. 15, 1969

3,439,348
ELECTROOPTICAL MEMORY

Thomas J. Harris, Poughkeepsie, N.Y., Kurt M. Kosanke, Stuttgart-Degerloch, Germany, Werner W. Kulcke, Poughkeepsie, N.Y., and Erhard Max, Sindelfingen, Germany, assignors to International Business Machines Corporation, Armonk, N.Y., a corporation of New York Filed Jan. 14, 1966, Ser. No. 520,748
Int. Cl. G11b *11/10*
U.S. Cl. 340—173 5 Claims

ABSTRACT OF THE DISCLOSURE

This invention relates to information storage systems in which electrooptic techniques are utilized to digitally index the position of a beam of light, and more particularly to means for reading out of such systems.

Figure 1:
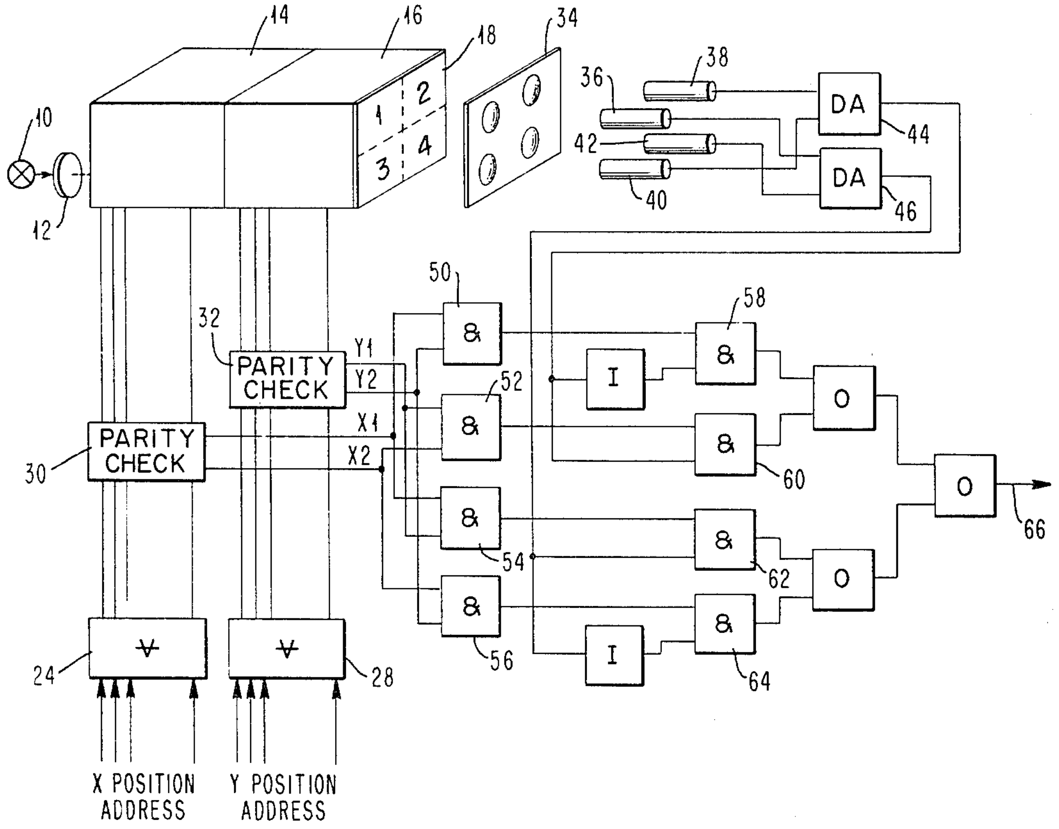

Copending patent application 285,832—Light Beam Deflection System—by T. J. Harris et al., filed June 5, 1963, discloses a light positioning system for use in laser or optical maser systems. The apparatus includes a plurality of light deflection stages. The light applied to the light deflection stages is linearally polarized and either collimated or convergent. Each light deflection stage includes a first portion for receiving as an input the linearally polarized light beam and provides an output of one of two possible light beams having polarization directions differing by 90°. A second portion of each light deflection stage causes deflection of the light beam when the beam is polarized in one direction and has no effect on the path of the light beam when the beam is polarized in the second direction. The control by a switch of the polarization of the incoming light beam by the first portion therefore allows selection of one of two spatially separated outputs from each light deflection stage. The series of such light deflection stages allows the precise positioning of the light beam over a large number of discrete outputs. The number of discrete output positions depends on the number of light deflection stages employed.

An optical memory may be read by the light beam. For example, an opaque spot at a position on the memory could indicate a binary zero, and a transparent spot could indicate a binary one, stored in that position, or vice versa. A photocell at the memory output can be used to detect the presence of a binary one in the selected position. Since background light (noise) is introduced into the system, such a reading device must have means for compensating for light outputs other than those at the addressed position when reading out with the digital light deflector.

It is therefore a paramount object of this invention to provide an improved detection system for reading the output of an optical memory system.

It is also an object of this invention to provide a reading means for an optical memory system which compensates for light outputs other than those at the addressed position.

The foregoing objects are accomplished in accordance with the invention by utilizing the discovery that noise levels at the output of the optical memory system are uniquely distributed among the output position areas thereof. The output position desired is addressed digitally, by converting a position address to digital switch settings at each deflector stage. The output position areas are divided into quadrants 1–4, each having a unique distribution of noise levels.

The output position address is indicated by digital $x$ and $y$ position locations taken from digital switch setting addresses. A parity count is taken over the $x$ and $y$ switch addresses. The switch address sets the light deflector switches which direct the light output to the addressed position.

The parity indicates the quadrant of the addressed position. Quadrants 1 and 4 are read out by the photodetectors, the outputs of which are fed to difference amplifiers. Quadrants 2 and 3 are read out in similar manner. The output of the difference amplifiers can be either positive or negative depending upon which of the diagonal quadrants the addressed position is in. The difference amplifier output is combined with the parity indication to provide an output signal which indicates the presence or absence of a bit in the addressed position.

The invention has the advantage that it provides a high signal-to-noise ratio readout signal.

The foregoing and other objects, features and advantages of the invention will be apparent from the following more particular description of a preferred embodiment of the invention as illustrated in the accompanying drawings.

Figure 2:
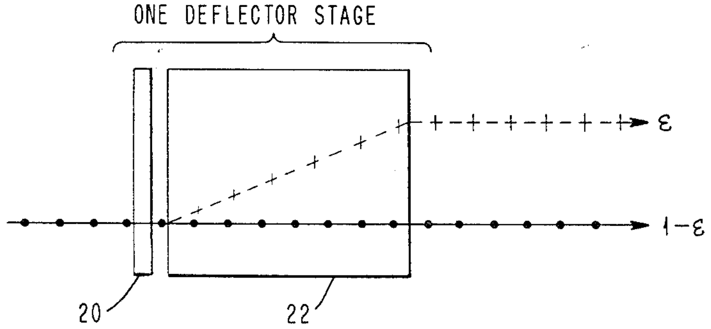

In the drawings:

FIG. 1 is a block schematic drawing of a light deflection system in which the present invention is embodied; and FIG. 2 is a schematic drawing of one digital deflector stage thereof.

Referring now to FIG. 1, there is shown a light deflector for discretely positioning a small cross-sectional beam of linearly polarized light. The light deflector is more fully described in the above identified Harris et al. application and is therefore illustrated in block form and described only briefly. The present invention is described with reference to the first embodiment disclosed in the above identified application, but it should be understood that the invention can also be practiced utilizing the converging beam embodiment disclosed therein. A high intensity light is obtained from light source 10 which is preferably a monochromatic source of light and may be a continuous wave or pulsed laser light source. The light is passed through a collimating lens 12. The collimated light may now be passed through a linear polarizer and through an aperture in a plate (not shown). The portion of the light beam passing through the aperture is directed to the first stage of a light deflection system. These elements are embodied in the block labelled 14 and are more fully disclosed in the above identified Harris et al. application.

Referring now to FIG. 2, each light deflector stage within the block 14 includes two basic components. The first component which the light encounters is an electrooptic element 20 which provides an output of one of two possible light beams which are different from one another by 90° in their polarization directions. The second component of the light deflection stage is a birefringent means 22 which is spatially cut to allow the incoming light beam to pass through its body either as the ordinary or extraordinary ray, depending upon the entering polarization direction of the beam. A linearally polarized light beam polarized perpendicular to the plane of the drawing will pass through the birefringent means 22 without any deflection therein as the ordinary ray of the crystal. However, if the linearally polarized light beam is polarized parallel to the plane of the paper, the light beam passes as the extraordinary ray in a direction different from the ordinary ray and leaves the crystal at a point which is spatially separated from the ordinary ray output position. Because of misalignment of the optical elements, variation in applied voltage and convergence of the light beam, a fraction (E) of the incident light follows the extraordinary path when the switch is set for the ordinary path. Thus, if unit intensity enters the stage, 1–E intensity, actually reaches the desired output position along the ordinary path and E intensity reaches an undesired output position via the extraordinary path.

The light beam passes from the first stage to the second stage, etc., through the $x$ position deflection system 14. If none of the succeeding stages is energized, the beam will be deflected by each succeeding stage, because its polarization will remain rotated.

A $y$ position deflection system 16 is provided which is identical to the $x$ deflection system except that the deflection is in the vertical direction, whereas in the $x$ deflection system 14, deflection is in the horizontal direction. Additional stages are added where more discrete light output positions are required. Deflection stages in both $x$ and $y$ systems are arranged in increasing order of deflection, by a factor of two.

Each stage is provided with a switch, which when closed energizes the electrooptic element of that stage to change the polarization of the light beam. The combination of switches necessary to obtain a particular output is called the "switch address" (SA). The binary notation which selects the desired output position is referred to as $x$ or $y$ "position address" (PA).

The binary position address must be converted to a switch address in order that the beam be deflected to the desired position. The position address is related to the switch address by an Exclusive OR relationship disclosed in patent application Ser. No. 436,109, filed Mar. 1, 1965, by W. L. Duda et al. These Exclusive OR circuits are represented by logic blocks 24 and 28.

A feature of the addressing system disclosed in the Duda et al. application is the parity of the switching address. The parity may be defined as "even" or "odd" referring to an even or odd number of "1's" in the SA's. The special arrangement of the deflector stages in increasing order of deflection enables the use of the parity of the SA's to classify the PA's into groups which are spatially separated. All $y$ switch addresses with even parity cause the light beam to be deflected to the lower half of the memory. The odd parity addresses cause the light beam to be deflected to the upper half of the memory. In the case of a two-dimensional light deflector, there is a classification of the PA's by means of the SA-parities into quadrants. All position addresses PA given by PA-$x$ and and PA-$y$, with corresponding equal parity switch addresses (SA-$x$, SA-$y$), are placed in the same quadrant. This feature is independent of the deflection direction of one or more stages, except that the qaudrants become interchanged symmetrically.

Table 1 illustrates the relationships described above for the $y$ vertical deflection. For example, light enters stage 1, and is rotated 90° if switch S1 is closed. The beam is deflected one unit by the birefringent means. If switches S2 and S3 remain open, the beam remains rotated and is deflected 2 units by the second state, and 4 units by the third stage. The output then occurs at location 7, the sum of deflecting 1+2+4 units. The position address is 1 1 1 (7) and the switch address is 0 0 1, odd parity, falling in the upper half of the position addresses.

To deflect only 1 unit, the second stage switch S2 must be closed to thereby change the polarization so that no further deflection of the beam occurs. Of course if switch S3 is left open, no deflection in stage 3 will occur. In this case the position address is 0 0 1 (1) and the switch address is 0 1 1 (even parity).

TABLE 1

| Vertical position Y | Y-position address (4–2–1) | Switch address (S3–S2–S1) | Y parity | Quadrant |
|---|---|---|---|---|
| 7 | 1 1 1 | 0 0 1 | Odd | 1 or 2 |
| 6 | 1 1 0 | 0 1 0 | Odd | 1 or 2 |
| 5 | 1 0 1 | 1 1 1 | Odd | 1 or 2 |
| 4 | 1 0 0 | 1 0 0 | Odd | 1 or 2 |
| 3 | 0 1 1 | 1 0 1 | Even | 3 or 4 |
| 2 | 0 1 0 | 1 1 0 | Even | 3 or 4 |
| 1 | 0 0 1 | 0 1 1 | Even | 3 or 4 |
| 0 | 0 0 0 | 0 0 0 | Even | 3 or 4 |

Referring again to FIG. 1, the fact that the parity of the $x$ and $y$ switch addresses indicates the quadrant of the addressed position is utilized to read out of the memory. A parity check is performed on the $x$ and $y$ switch address by parity check circuits 30, 32. An even parity from the parity check circuit 30 causes the output X1 to be positive. An odd parity causes X2 to be positive. An even parity from parity check circuit 32 causes output Y1 to be positive and an odd parity causes output Y2 to be positive. The switch address switches appropriate light deflector stages to cause a light output to be directed to the addressed position. The parity check of the switch address identifies the quadrant of the addressed position. The quadrants are masked by a lens mask 34 and are read out by respective photocells 36, 38, 40 and 42. The photocell outputs of diagonal quadrants are fed to difference amplifiers 44, 46. The difference amplifier output is either a positive or a negative pulse depending upon which of the diagonal quadrants the addressed position is in. One of the AND gates 50, 52, 54, 56 is energized by the parity check outputs Y1, Y2, X1 and X2 to provide an output pulse corresponding to one of the quadrants 1–4. The outputs from the difference amplifiers 44, 46 are fed to AND circuits 58, 60, 62 and 64, which compare the quadrant indicated by the parity check circuits with the quadrant read by the photocell circuitry. Any output from the AND circuits 58–64 causes an output on a readout signal line 66, thus indicating the presence or absence of a bit in the addressed position. This circuit arrangement has a higher signal-to-noise ratio than a circuit using: (1) one photocell covering the entire memory area or (2) one photocell covering only the addressed quadrant. If the selected address lies in quadrant 2, for memories having many positions there is almost equal distribution of noise in quadrants 2 and 3. Thus if the output of photocell 40 reading the signal (all noise) in quadrant 3 is subtracted from the output of photocell 38, reading the signal in quadrant 2, the noise in quadrant 2 is substantially cancelled by the noise generated in quadrant 3. Obviously the signal-to-noise ratio is higher than if only one photocell covered all quadrants, in which event all of the noise would be read. The signal-to-noise ratio is also higher than if one photocell read only the selected quadrant, in which event the noise would not be cancelled.

While the invention has been particularly shown and described with reference to a preferred embodiment thereof, it will be understood by those skilled in the art that various changes in form and details may be made therein without departing from the spirit and scope of the invention.

What is claimed is:

1. In an optical memory which includes a plurality of light deflecting stages through which a beam of linearly polarized light may be passed either with or without deflection depending on its plane of polarization, to energize a desired location on a memory, an electrooptic device at the input side of each deflecting stage operable when energized to rotate the plane of polarization of light passing therethrough, to thereby cause deflection of the light beam, and means including a switch associated with each electrooptic device and operable when closed for energizing such device and also energizing the electrooptic device for the next succeeding stage when the switch associated with the latter is open, the improvement comprising:

reading means for detecting light emitted at a first area of said memory and for providing an output manifestation indicative of the light intensity at said area;

reading means for detecting light emitted at a second area of said memory and for providing an output manifestation indicative of the light intensity at said area;

subtracting means for subtracting the output manifestation of one of said reading means from the output manifestation of the other reading means; and utilization means operative upon energization of an odd number of electrooptic devices and upon the occurrence of an output of one polarity from said subtracting means.

2. The combination according to claim 1 wherein said utilization means is also operative upon energization of an even number of electrooptic devices and upon the occurrence of an output of opposite polarity from said subtracting means.

3. In an optical memory system in which data are read by positioning a light beam on a memory plane in response to a switch address applied to deflection stages, the presence or absence of light at said plane indicating the presence or absence of data stored at the position selected, the improvement comprising:

means for translating the switch address to an output which when energized indicates that a first area of said memory includes the selected storage position, represented by said switch address;

means associated with said first area of said memory for detecting light output from said memory at said area, and for generating a signal in proportion to the light detected;

means associated with a second area of said memory for detecting light output from said memory at said area, and for generating a signal in proportion to the light detected;

means for subtracting said generated signals to thereby cancel equal signals occurring at said detection means; and means responsive to coincidental energization of said translating means output and an output from said subtracting means for generating an output indicative of a binary data bit stored in the memory location selected by said switch address.

4. An optical memory, comprising:

X and Y sets of light deflection stages arranged in alignment so that a beam of light passes through them serially, the X deflection stages oriented for horizontal deflection of the beam over a memory surface, and the Y deflection stages oriented for vertical deflection of the beam over the memory surface;

the light deflection stages of each set including birefringent elements increasing in thickness by a factor of two;

an electrooptic device at the input side of each birefringent element;

means including a switch associated with each electrooptic device and operable when closed for energizing its associated device if the switch for the next preceding stage is open, each switch also effecting an energizing of the electrooptic device for the next succeeding stage if the switch for the latter stage is open;

means for directing through said stages a beam of light polarized in a plane to pass normally therethrough as an ordinary ray, said light beam being deflected in birefringent elements following electrooptic devices whose associated switches are closed so the light output at the last stage is at a position representative of the X and Y coordinates selected by said switches;

Y parity means operative upon energization of selected electrooptic devices in the Y-set of deflection stages for generating a Y-odd output if an odd number are energized and a Y-even output if an even number are energized;

X parity means operative upon energization of selected electrooptic devices in the X-set of deflection stages for generating an X-odd output if an odd number are energized and an X-even output if an even number are energized;

means for combining the odd-even parity outputs to thereby energize an output corresponding to the quadrant in which the memory position selected is located;

sensing means at each quadrant of said memory responsive to the light intensity at said quadrant for generating an output manifestation for each quadrant proportional to the light intensity at the quadrant;

means for subtracting the light intensity manifestation of a pair of quadrants and for generating an output manifestation proportional to the difference in intensity therebetween; and gating means energized by the output of said combining means for gating the output of said subtracting means to a utilization device.

5. The combination according to claim 4 wherein the subtracting means subtracts the light intensity manifestation of a pair of diagonally opposite quadrants of the memory.

References Cited

UNITED STATES PATENTS 3,248,552 4/1966 Bryan.

TERRELL W. FEARS, *Primary Examiner.*

U.S. Cl. X.R.

88—1